UNITED STATES PATENT OFFICE

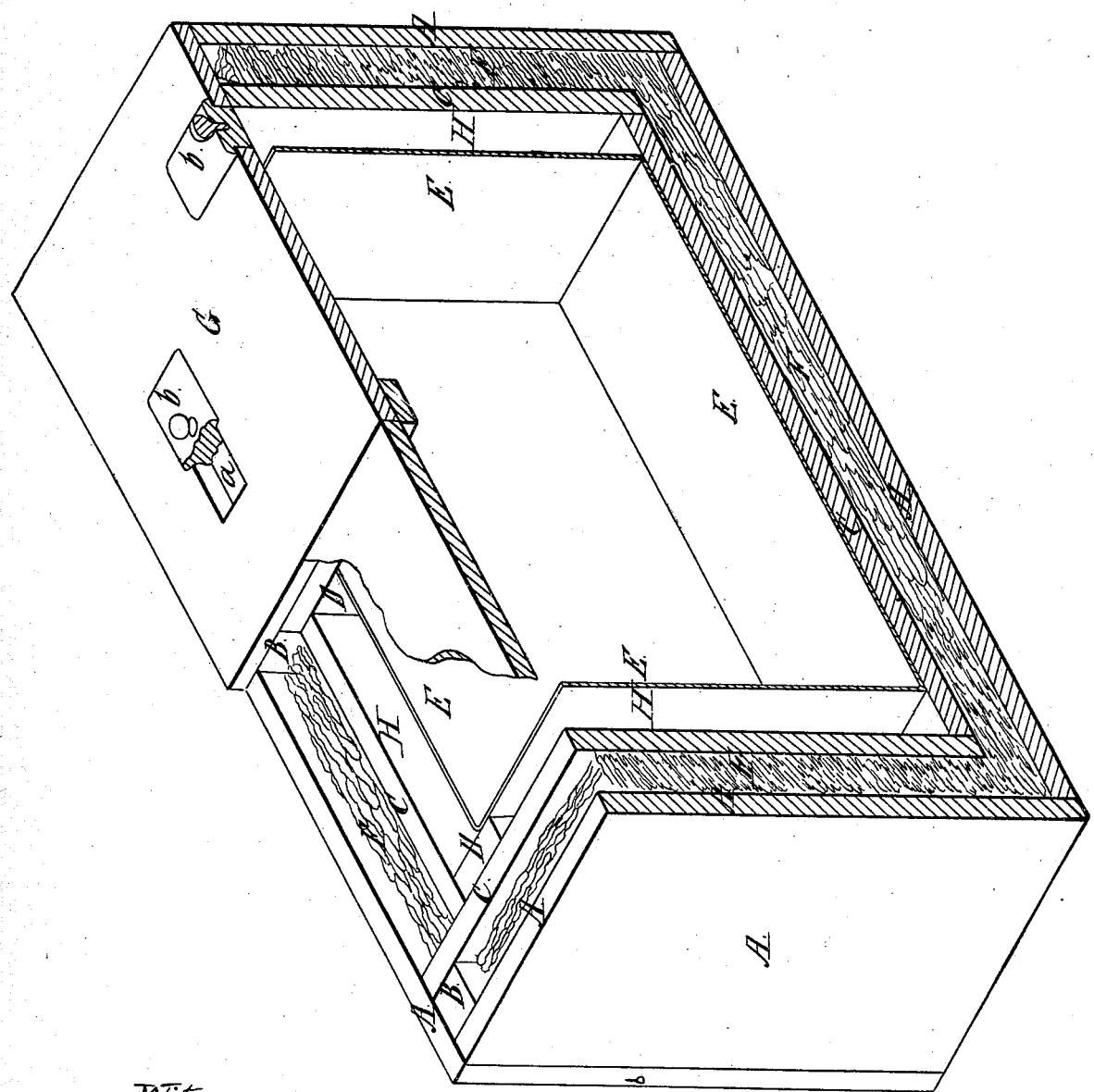

WILLIAM DAVIS, OF DETROIT, MICHIGAN.

IMPROVEMENT IN APPARATUS FOR PRESERVING AND TRANSPORTING FISH.

Specification forming part of Letters Patent No. 85,914, dated January 19, 1869.

*To all whom it may concern:*

Be it known that I, WILLIAM DAVIS, of Detroit, in the county of Wayne, in the State of Michigan, have invented a new and Improved Preserving-Chamber for Preserving Fish, Meats, or other substances after they are frozen; and I do hereby declare that the following is a full and exact description thereof, reference being had to the drawings accompanying and forming a part of this specification, in which the chamber, room, or box is shown in perspective section, and in such a manner that all the parts are readily seen and understood, and in which—

A represents the outer wall of the chamber, room, or box, and may be in quadrangular or other form, as desired.

B B are corner studs or posts, which not only serve to strengthen the construction, but also serve to make the space F of sufficient width, which space is filled with a poor or non conducting material.

C is an inner tight partition, and forms the inner side of space F.

D D are posts, similar to B, and serve to make another space, H, between partition C and metal lining E. The space H is filled with a freezing mixture of ice and salt, or other freezing agent that answers the same purpose and effects the same result.

E is the galvanized or other suitable metal lining, and forms the walls of the chamber or box, and is both air and water tight, or nearly so, and within which the fish or other thing to be preserved is placed.

Over the whole is a tight-fitting roof, ceiling, or cover, G, and, when necessary, can be constructed with spaces and chambers, and filled the same as the walls, except where the openings *a* are made through the same, which openings are made to correspond with the spaces H, and through such openings the spaces H are filled with the freezing material.

Openings *a* are supplied with tightly-fitting covers or hatches *b*, which are removed, when necessary, to fill space H with freezing material.

The object of this invention is to produce a chamber for preserving, for a long time, such fish, meats, or other things that have been frozen by other means; and it consists in the construction of such chamber, room, or box, in the manner as above described, and having the spaces, partitions, linings, and cover arranged as shown.

It is a well-understood fact, and particularly in preserving fresh fish, that, after the fish are once solidly frozen, a temperature but a few degrees below the freezing-point will keep the fish from thawing, and thus preserve them from decay for a long time, and that, too, in a perfect manner, and by the construction, in the manner described, of such chamber, room, or box, the best results for such purpose are attained in a better manner and less in expense than any other known method, besides being simpler and cheaper in construction.

Any known method can be used for ingress into the chamber, but the method used should always be provided with the means to keep the opening for such purpose as nearly air-tight and to be opened as unfrequently as possible, in order to keep the temperature in the chamber a few degrees below the freezing-point.

I am aware that there are many constructions in which air-spaces and spaces to be filled with poor conductors are used for refrigerating purposes; but all such as have heretofore been used are expensive in construction and defective in their operations as compared with this invention, and I do not broadly claim any single feature in this construction as new and of my invention; but What I do claim, and desire to secure by Letters Patent, is—

The preserving chamber, room, or box, as a whole, when constructed with the walls A, posts B, chamber F, when filled with a bad conducting material, partition C, posts D, chamber H, metal lining E, and cover G, opening *a*, and hatches *b*, arranged with relation to each other, and to operate in the manner substantially as described, for the purpose set forth.

WILLIAM DAVIS.

Witnesses:
HENRY N. MYGATT,
NEWTON CRAWFORD.